United States Patent [19]

Bienvenu et al.

[11] Patent Number: 4,472,771

[45] Date of Patent: Sep. 18, 1984

[54] DEVICE WHEREIN A CENTRAL SUB-SYSTEM OF A DATA PROCESSING SYSTEM IS DIVIDED INTO SEVERAL INDEPENDENT SUB-UNITS

[75] Inventors: Jacques M. J. Bienvenu, Paris; Pierre G. Antoine, Palaiseau; Robert J. A. Bavoux, Rueil Malmaison; Daniel R. Vinot, Sucy en Brie, all of France

[73] Assignee: Compagnie Internationale pour l'Informatique CII-Honeywell Bull, Paris, France

[21] Appl. No.: 206,538

[22] Filed: Nov. 13, 1980

[30] Foreign Application Priority Data

Nov. 14, 1979 [FR] France ................. 79 28076

[51] Int. Cl.³ .............................................. G06F 15/16
[52] U.S. Cl. ..................................................... 364/200
[58] Field of Search ................................ 364/200, 900

[56] References Cited

U.S. PATENT DOCUMENTS

| | | | |
|---|---|---|---|
| 3,480,914 | 11/1969 | Schlaeppi | 364/200 |
| 3,544,973 | 12/1970 | Borck et al. | 340/172.5 |
| 3,573,852 | 4/1971 | Watson et al. | 340/172.5 |
| 3,581,291 | 5/1971 | Iwamoto et al. | 340/172.5 |
| 3,768,074 | 10/1973 | Sharp et al. | 340/172.5 |
| 3,787,816 | 1/1974 | Hauck et al. | 364/200 |
| 3,812,468 | 5/1974 | Wollum et al. | 364/200 |
| 3,812,469 | 5/1974 | Hauck et al. | 364/200 |
| 4,014,005 | 3/1977 | Fox et al. | 340/172.5 |
| 4,070,704 | 1/1978 | Calle et al. | 364/200 |
| 4,171,536 | 10/1979 | Heuer et al. | 364/200 |

Primary Examiner—Jerry Smith
Assistant Examiner—Jameson Lee
Attorney, Agent, or Firm—Lowe, King, Price & Becker

[57] ABSTRACT

A central sub-system of a data processing system, including an operator console controlling a service processor, is divided into several sub-units, functioning separately from each other. The sub-units include processors that are connected together and to a common controller for a common memory unit by data, address and control buses. Each sub-unit includes a configuration device that stores an appurtenance indicator derived from the service processor in response to sub-unit initialization, and enables its associated sub-unit to exchange data with the memory unit. The sub-unit having the highest priority of the sub-units attempting to access the memory units is connected to the memory unit by the controller. A single configuration memory stores an indication of the sub-units in service in the central sub-system. The configuration memory is addressed each time the memory unit is addressed by a signal indicative of the appurtenance indicator derived from the selected sub-unit. The configuration memory derives an authorization signal that commands performance of memory cycles by the selected unit when the configuration memory contains an indication that the selected sub-unit is in service in the sub-system. The controller includes memorization means for storing the highest priority sub-unit trying to access the memory unit. The memorization means derives an output that is coupled to the data address and control buses to transmit a signal indicative of the number of the sub-unit with data to be exchanged with the memory unit to each of the authorizing means, thereby to establish data transmission between the sub-unit having the highest priority and the memory unit.

15 Claims, 7 Drawing Figures

DEVICE WHEREIN A CENTRAL SUB-SYSTEM OF A DATA PROCESSING SYSTEM IS DIVIDED INTO SEVERAL INDEPENDENT SUB-UNITS

TECHNICAL FIELD

The present invention relates to a central sub-system of a data processing system divided into several sub-units between several users so that operations of the various sub-units appear to the sub-units to be completely separate. More particularly, the invention relates to a data processing system including processing units or microprocessors coupled by data and address buses to a memory unit and to each other wherein the different processing units have a predetermined allocation as a function of the sub-units desiring to exchange data with the memory unit.

BACKGROUND ART

In the past, resources of a data processing system have been allocated with the aid of appropriate hardware, logic devices and software. The allocation has been controlled from an operator's console. Such a system is described in an article entitled "DIPS 1 System Supervision and Control" appearing in the journal entitled "Review of the Electrical Communication Laboratories", Volume 21, Numbers 3-4, March-April, 1973. In the system described in this article, the data processing system is provided with a configuration that resolves the logic problems to each of the users. Connection states between different sub-units of the system are modified as a function of state switches at the operator's console, either by manipulating the switches directly or by initiating a special reconfiguration program in a memory of the system.

Another system for allocating resources of a data processing system is disclosed in U.S. Pat. No. 4,014,005, entitled "Configuration And Control Unit For A Hetergeneous Multisystem", directed to a configuration unit (CACV) for different types of processors associated with peripheral units of various input-output channels. The configuration unit is controlled from an operator's console and is situated at a central point of the data processing system, enabling the configuration unit to communicate directly with all elements of the system with the aid of cross bar channel multiplexers. The configuration unit disclosed in U.S. Pat. No. 4,014,005 does not adapt easily to a data processing system that is organized around a single bus containing address, data and control information primarily because the multiplexing units are a significant burden on the constitution of the system.

To resolve this problem, a purely logic solution is often used in systems organized around a single bus containing address, data and control signals. The logic solution involves establishing, for each user, a purely artificial system configuration that executes programs stored in the system memory unit. The artificial system configuration is due to logic of "the virtual machine monitor software". In this solution of the allocation problem, the configuration of the actual system frequently differs from that presented by the virtual or artificial system.

The user of the artificial or virtual system enables several users to perform functions on the same real system by using different operating systems. The virtual or artificial system, however, does not enable a user to know the configuration which is assigned to him. This is particularly disadvantageous because a user may be disrupted by an operating program of another user of the system without his knowledge. To overcome this disadvantage, programmers frequently use protective algorithms which are not satisfactory because they are very unwieldy and upset the processing speed of the system.

It is, accordingly, one of the objects of the present invention to provide a new and improved central sub-system of a data processing system divided into several independent sub-units.

Another object of the invention is to provide a purely hardware device for providing a user of a data processing system sub-unit an actual view of the portion of the system assigned to him.

Another object of the invention is to enable sub-units of a data processing system central sub-system to function in a configuration which is associated only with the sub-unit, thereby avoiding disturbances to other sub-units and enabling the different sub-units to be simultaneously activated.

By utilizing hardware, instead of software, to solve the allocation resources problem, greater flexibility is provided. A judicial distribution of the hardware in the data processing system permits isolation in an absolute manner of each sub-unit of the central subsystem, enabling the sub-units to respond to configuration needs of the various users.

DISCLOSURE OF INVENTION

In accordance with the present invention, a central sub-system of a data processing system is divided into several sub-units. The functioning of each sub-unit is completely separate from the remaining sub-units such that each sub-unit is composed of at least one processor having input-output channels.

More particularly, the invention is directed to a central data processing sub-system divided into several sub-units. The central sub-system includes a service processor controlled from an operator's console. The sub-units are connected together by data, address and control buses. Each sub-unit has the ability to function separately from the other sub-units and includes at least one processor having an input-output channel. The sub-system is connected by the address and data buses to a memory unit for storing programs and data associated with the sub-units of the system.

Each sub-unit, according to the invention, includes a configuration device having means for storing an appurtenance indicator derived from the service processor in response to initialization of each sub-unit, each of which is assigned a different priority. The configuration device enables its associated sub-unit to exchange data with a memory unit. The enabled sub-unit is the sub-unit having the highest priority of the sub-units with data to be exchanged with the memory unit. The central data processing sub-system includes a single configuration memory for storing the state of the sub-units in service in the central sub-system. The configuration memory is addressed each time the memory unit is addressed by a sub-unit selected to exchange data with the memory unit. The configuration memory is addressed by a signal indicative of the appurtenance indicator of the selected sub-unit. The configuration memory derives an authorization signal that commands performance of memory cycles by the selected unit when the configuration memory contains an indication that the selected sub-unit is in service in the sub-system. If the configuration memory does not contain an indication that the highest priority selected sub-unit is in service, the sub-unit having the next highest priority trying to access the memory unit is considered.

A memory control unit includes a priority circuit for selecting the highest priority sub-unit with data to be exchanged with the storing unit. The controller includes memorization means for storing the highest priority sub-unit trying to access the memory unit. The memorization means derives an output that is coupled to the data, address and control buses to transmit a signal indicative of the number of the sub-unit with data to be exchanged with the memory unit to each of the means for authorizing the exchange of data of the configuration device, thereby to establish data transmission between the sub-unit having the highest priority and the memory unit.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 3b is a circuit diagram of gates used in the priority circuit of FIG. 3a;

FIG. 3c is a circuit diagram of coders employed in the priority circuit of FIG. 3a; and FIG. 4 is a block diagram of a sequencer employed in the device of FIG. 2a.

DETAILED DESCRIPTION OF THE DRAWING

Figure 1:
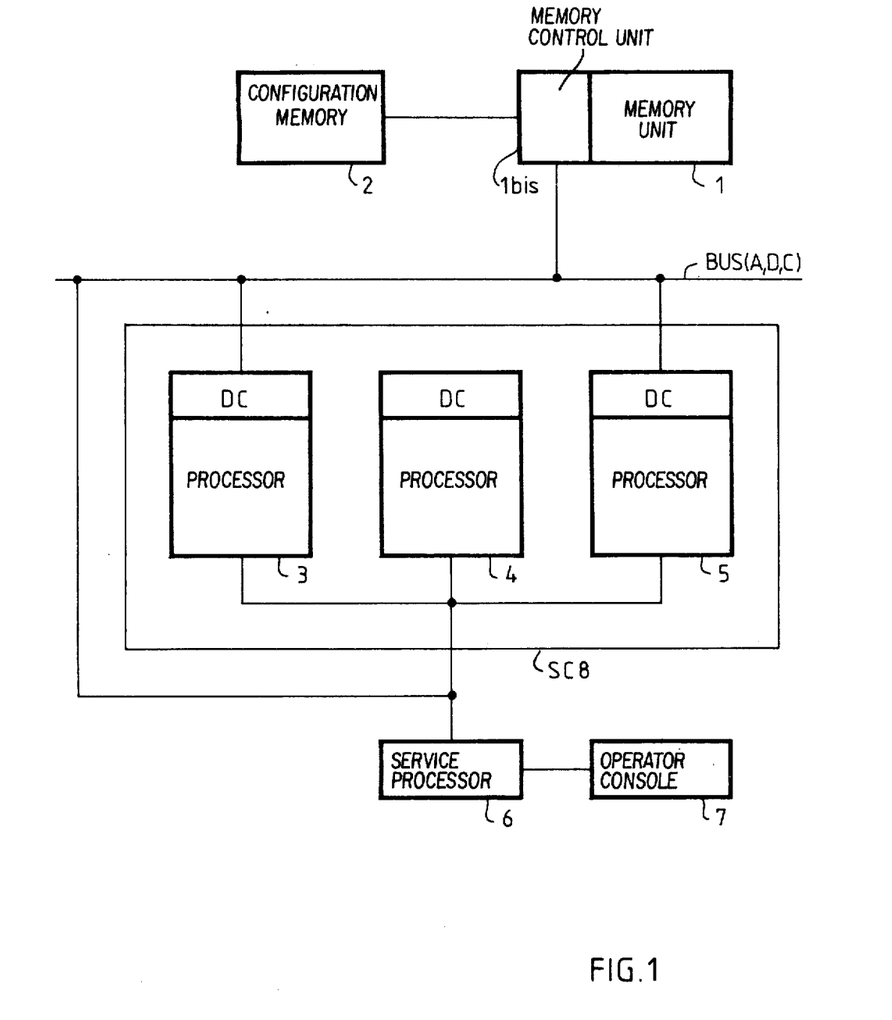
FIG. 1 is a block diagram of a data processing system including a central sub-system divided into several identical sub-units, each of which is allocated to a single user.
Figure 2A:
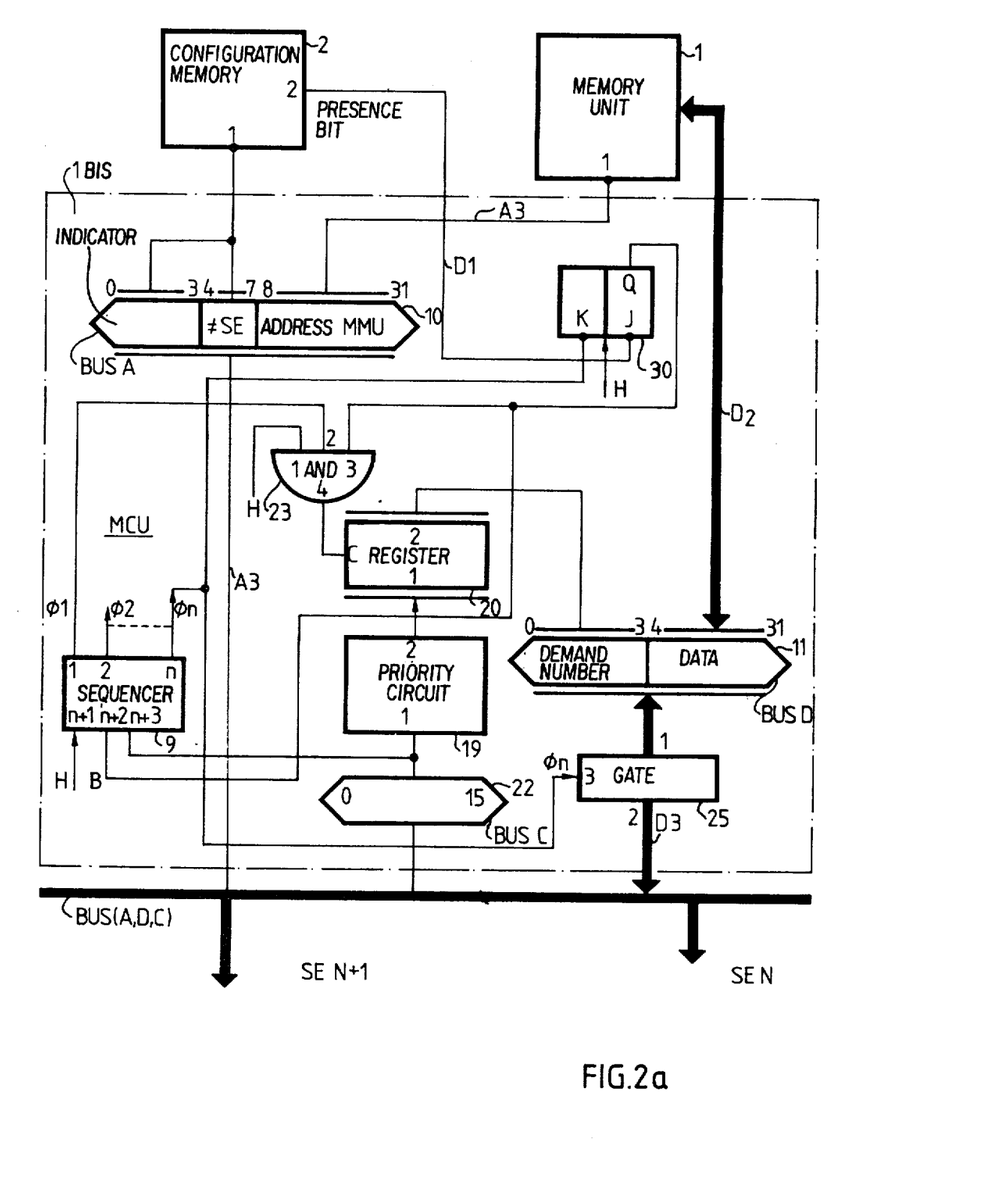
FIG. 2a is a block diagram of a control circuit for enabling a configuration memory and a memory unit in the system of FIG. 1 to be adapted to a control sub-system of a data processing system.

Reference is now made to FIG. 1 of the drawing, wherein a central sub-system SC8 of a data processing system is illustrated as including sub-units 3, 4 and 5. Each of sub-units 3, 4 and 5 includes a processor P and a configuration device DC, as specifically illustrated in FIG. 2b. Processors P can be different structures, such as microprocessors, e.g., an INTEL 8080 or a ZILOG 80, or a processor of the type described in U.S. Pat. No. 3,400,371. Sub-units 3, 4 and 5 are interconnected by a multibit bus, including address bus A, data bus D, and control bus C; buses A, D and C are also connected to control unit 1 bis, which is coupled to memory unit 1 and configuration memory 2. In a preferred embodiment, memory control unit 1 bis is illustrated in FIG. 2a.

Control of central sub-system SC8 and of memory control unit 1 bis, hence memory unit 1 and configuration memory 2, is provided by a conventional operator console or key board 7, coupled to buses A, D and C and to processors P of sub-units 3, 4 and 5 by service processor 6. Service processor 6 is a processor similar to processor P in sub-units 3, 4 and 5. Service processor 6 is connected to buses A, D and C so that the service processor has direct access to configuration memory 2 by way of memory control unit 1 bis.

Configuration memory 2 is a read/write random access memory (RAM) that stores configuration parameters corresponding to which of sub-units 3, 4 or 5 is in operation in the data processing system including central sub-system SC8. Configuration memory 2 is updated in response to signals from operator console 7, as coupled to the configuration memory from service processor 6, buses A, D and C and memory control unit 1 bis. Processors P of sub-units 3, 4 and 5 are indexed selectively within central sub-system SC8 by a signal derived from operator console 7 and indicative of a selected number for the sub-unit; the number assigned to each processor of the selected sub-unit 3, 4 or 5 is hereinafter called "applicant number" and the sub-unit attempting to gain access to memory unit 1 is referred to as the "applicant sub-unit".

Each of the processors P in sub-units 3, 4 and 5 shares space within memory unit 1 with the remaining processors of sub-system SC8. Access to memory unit 1 by processors P of sub-units 3, 4 and 5 cannot take place simultaneously. To avoid simultaneous attempts to access memory unit 1, control unit 1 bis includes a priority circuit that is duplicated in configuration device DC of each of sub-units 3, 4 and 5 of central sub-system SC8.

Figure 2B:
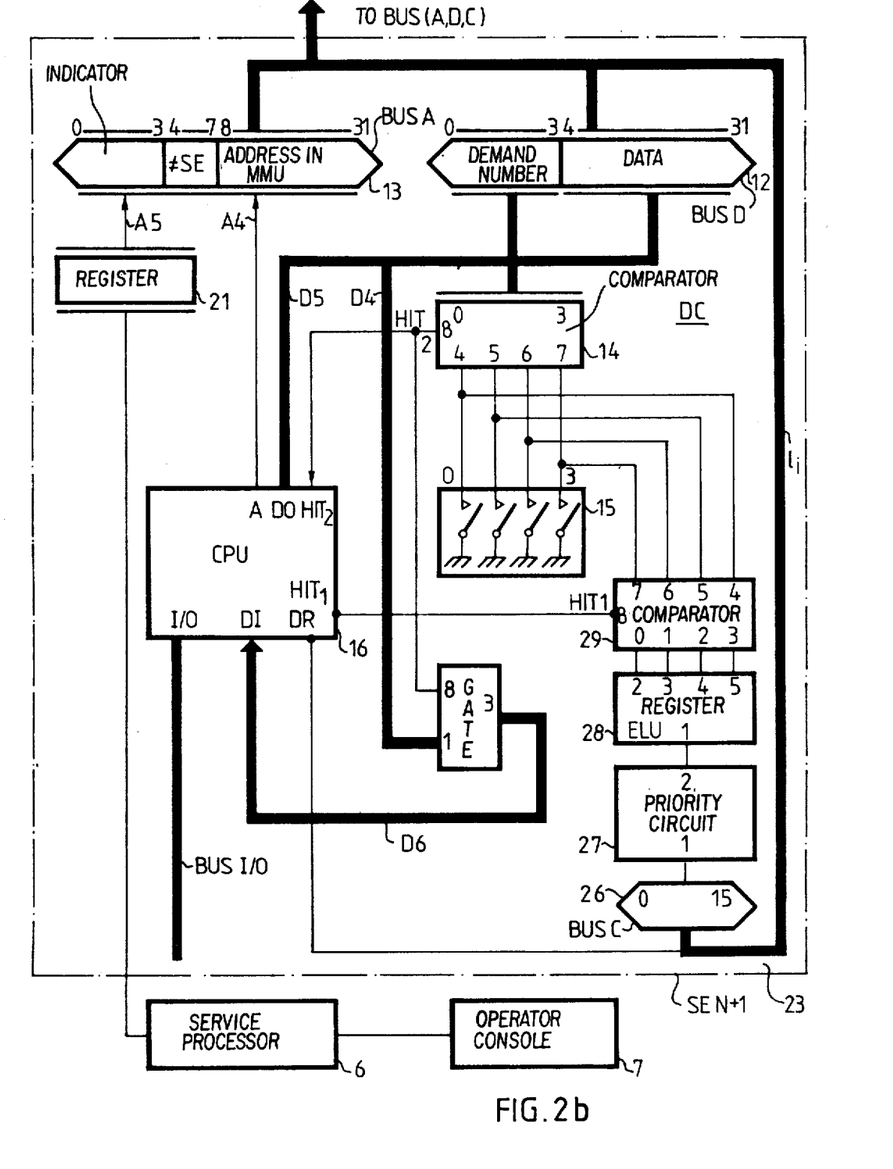
FIG. 2b is a block diagram of a configuration device in accordance with the invention; a separate configuration device is mated with each sub-unit of the central sub-system of FIG. 1.

As described infra in connection with FIGS. 2a and 2b, in response to one of sub-units 3, 4 or 5, obtaining control of buses A, D and C to access memory unit 1, two actions occur simultaneously. In particular, reconfiguration device DC of the applicant sub-unit addresses configuration memory 2 with the assistance of the sub-unit appurtenance indicator. The appurtenance indicator of the sub-unit is attributed to the sub-unit by a signal from operator console 7 as central sub-system SC8 is initialized. The other action which occurs simultaneously with a sub-unit obtaining control of buses A, D and C is that processor P of the applicant sub-unit addresses configuration memory 2 with the assistance of a sub-unit identification number stored in the sub-unit.

Configuration memory 2 replies to the appurtenance indicator and the addressing thereof by processor P of the applicant sub-unit by supplying a number representing signal to one of buses A, B and D. The number representing signal supplied by configuration memory 2 to one of buses A, B and D indicates whether the applicant processor has been put into service in response to a signal from operator console 7. If the configuration memory 2 indicates that the applicant processor of sub-unit 3, 4 or 5 has been put into service by operator console 7, the configuration memory derives a signal which indicates that the applicant sub-unit has been put into service; this signal is coupled to control unit 1 bis which derives a signal representing the number of the applicant sub-unit. The signal representing the applicant sub-unit number derived from control unit 1 bis is compared to the applicant number identifying each of sub-units 3, 4 and 5, as stored in a coder in configuration device DC of each of the sub-units. The highest priority sub-unit that is desiring access to memory unit 1 and which has been put into service recognizes the signal representing the applicant number derived from control unit 1 bis to the exclusion of the remaining sub-units. Configuration unit DC in the sub-unit 3, 4 or 5 having control of buses A, D and C responds to the applicant number supplied to it from memory control unit 1 bis via one of buses A, D or C to provide for a data exchange between the processor of the applicant sub-unit 3, 4 or 5 and memory unit 1. While an exchange of data is thereby occurring between the applicant sub-unit 3, 4 or 5 and memory unit 1, the processors P of the remaining sub-units 3, 4 and/or 5 are isolated from buses A, D and C and are able to function independently of each other during the interval while the applicant processor exchanges data with memory unit 1. Thereby, sub-units 3–5 can function concurrently by sharing the space of memory unit 1 without any risk of interruption between a pair of sub-units.

Reference is now made to FIG. 2a of the drawing wherein there is illustrated a block diagram of details of memory control unit 1 bis in combination with configuration memory 2 and memory unit 1. Memory control unit 1 bis is directly connected to the bus including 32 bit address bus A 10, 32 bit data bus D 11 and 16 bit control bus C 22. Bus A 10 is divided into three segments for bits 0–3, 4–7, and 8–31. Bits 0–3 are referred to as indicator bits to enable 16 different sub-units in sub-system SC8 to be utilized; bits 4–7 signal that a sub-unit is not desiring access to memory unit 1; and bits 8–31 are address bits for data and program signals stored in memory unit 1. To these ends, bits 0–7 of bus A 10 are supplied to 8 parallel input terminals 1 of configuration memory 2, while bits 8–31 of bus A 10 are supplied to 24 parallel input leads 1 of memory unit 1.

In response to the address bits supplied to input terminals 1 of configuration memory 2, the configuration memory derives from terminal 2 a single output bit which indicates whether or not a particular one of sub-units 3, 4 or 5, as indicated by bits 0–3 of bus A 10, has been put into service in sub-system SC8 by operator console 7. In particular, if configuration memory 2 has been supplied by operator console 7 and service processor 6 with a signal indicating that a particular one of sub-units 3, 4 or 5 is in service in sub-system SC8, and that particular sub-unit is attempting to gain access to memory unit 1, configuration memory 2 derives a binary one signal. In contrast, if a particular one of sub-units 3, 4 or 5 is attempting to gain access to memory 1 but that sub-unit has not been put into service in sub-system SC8 by operator console 7, configuration memory 2 derives a binary zero signal. Thus, configuration memory 2, stores signals from operator console 7 indicative of the sub-units which are put into service in sub-system SC8 and includes a conventional comparison device responsive to the stored signals and bits 0–3 of bus A 10.

Memory unit 1 includes input terminals 1 responsive to address bits 8–31 of bus A 10, as coupled to bus A 3. Memory unit 1 reads data from and writes data into the memory unit at a selected address determined by the bit values supplied to terminals 1 thereof. To this end, memory unit 1 includes a 28 data bit bus D 2 responsive to bits 4–31 of bus D 11; the remaining bits, i.e., bits 0–3, of bus D 11, are reserved for the number of the sub-unit attempting to access memory unit 1, i.e., the applicant sub-unit number. Memories 1 and 2 are conventional read/write memories of the metal oxide semiconductor (MOS) type, for example, as sold by Texas Instruments Company, type TMS 4062.

Sixteen bit bus C 22 includes one bit for each of the possible sub-units, such as sub-units 3, 4 or 5, in sub-system SC8. When a particular sub-unit desires to gain access to memory unit 1, it supplies a binary one signal to an associated lead in bus C 22. The binary one signal is supplied by the sub-unit desiring access to memory unit 1 for the entire duration while such access is desired and while an exchange of data exists between the addressing sub-unit and memory unit 1. Because more than one sub-unit, such as sub-unit 3, 4 or 5, may desire access at any one time to memory unit 1, it is possible for more than one lead in bus C 22 to have a binary one value supplied to it at any one time. Thus, it is possible to establish a queue of sub-units 3, 4 or 5 waiting access to memory unit 1. In accordance with one aspect of the invention, a priority arrangement is established by operator console 7 for the applicant sub-units. Thereby, if plural sub-units 3, 4 or 5 are in a queue awaiting access to memory unit 1, the sub-unit having the highest priority gains access to the memory unit. The priority schedule for sub-units 3, 4 and 5 is established when sub-system SC8 is initialized by operator console 7 and can be changed at this time.

To enable the sub-unit 3, 4 or 5 having the highest priority to be selected, control unit 1 bis includes priority circuit 19, having 16 parallel input terminals 1, one for each of the leads in bus C 22. Priority circuit 19 responds to the 16 bits of bus C 22. If two or more of the bits of bus C 22 simultaneously have binary one values, circuit 19 selects the bit having the highest value. The bit having the highest value in bus C 22 thus corresponds to the sub-unit 3, 4 or 5 having the highest priority, and which is attempting to access memory unit 1, i.e., the applicant sub-unit having the highest priority. Priority circuit 19 responds to the 16 bit input thereof, and the priority criterion established therein to derive a four bit binary output signal having a value indicative of the number of the highest priority sub-unit 3, 4 or 5, attempting to gain access to memory unit 1. The four bit signal derived from priority circuit 19 is selectively coupled to four bit register 20, where it is stored and applied to bits 0–3 of data bus D 11.

Register 20 is enabled to be responsive to the output of priority circuit 19 immediately after one of sub-units 3, 4 or 5 that was previously exchanging data with memory unit 1 has been decoupled from the memory unit. To this end, control unit 1 bis includes sequencer 9 that synchronizes the various operations necessary to satisfy the demands for operation of each applicant sub-unit to memory unit 1. Sequencer 9 derives an output having n phases, $\phi_1, \phi_2 \ldots \phi_n$ which are sequentially derived in response to clock signal H being derived from a timing source (not shown) that is coupled to the sequencer. Only phases $\phi_1$ and $\phi_n$ of sequencer 9 control accessing of sub-units 3, 4 or 5 to memory unit 1, while providing perfect isolation of sub-units 3, 4 and 5 from each other during the interval while the sub-units are not accessing memory unit 1. During the interval between phases $\phi_1$ and $\phi_n$, buses A, D and C are free and can be assigned other tasks.

Sequencer 9 includes n output terminals 1, 2 . . . n, respectively provided for phases $\phi_1, \phi_2 \ldots \phi_n$. Sequencer 9 also includes three input terminals (n+1), (n+2), and (n+3). Input terminals (n+1), (n+2), and (n+3) of sequencer 9 are respectively responsive to timing signal H from a suitable clock source (not shown), an output signal representing the set (Q) state of J-K flip-flop 30, and the values of the bits of bus C 22. In response to flip-flop 30 being in the set state and any of the bits of bus C 22 having a binary one value, sequencer 9 is advanced from phase to phase in response to each clock pulse in signal H.

The signal at output terminal 1 of sequencer 19, having a binary one value while phase $\phi_1$ is occurring, is coupled to input terminal 2 of AND gate 23. Input terminal 1 of AND gate 23 is responsive to the timing signal H derived from the clock source while terminal 3 of the gate 23 is responsive to the set (Q) output of flip-flop 30. AND gate 23 includes an output terminal 4, connected to control input terminal C of four-stage buffer register 20, having four data input terminals connected to four output terminals of priority circuit 19. In response to sequencer 9 deriving phase $\phi_1$ simultaneously with flip-flop 30 being in the set state, AND gate 23 feeds a clock pulse in signal H to control input terminal C of register 20, to enable the register to be responsive to the four binary bits derived from priority circuit 20. Thereby, the number of the applicant sub-unit having the highest priority, as determined by priority circuit 19, is stored in register 20.

J-K flip-flop 30 is activated so that the Q output thereof has a binary one value in response to configuration memory 2 recognizing that an applicant sub-unit has been put in central sub-system SC8. The Q output of flip-flop 30 remains at the one value until a sequence initiated by the applicant sub-unit has been completed, i.e., when phase $\phi_n$ of sequencer 9 has been reached. To these ends, input terminal J of flip-flop 30 is coupled directly to output terminal 2 of configuration memory 2, while input terminal K of the flip-flop is connected directly to output terminal n of sequencer 9. Flip-flop 30 includes a trigger input terminal responsive to clock signal H. Output terminal Q of flip-flop 30 is connected directly to input terminal 3 of AND gate 23 and to input terminal (n+2) of sequencer 9. Binary one levels on input terminals J and K of flip-flop 30 cause the flip-flop to be respectively set and reset. At output terminal Q of flip-flop 30 binary one and zero values are derived immediately after the occurrence of clock signal H in response to the flip-flop being respectively set and reset. Sequencer 9 responds to the signal supplied to input terminals (n+2) and (n+3) thereof, as respectively derived from output terminals Q of flip-flop 30 and by an OR combination of the outputs of bus C 22 such that the sequencer responds to pulses of signal H only in response to binary one signals being applied to both terminals (n+2) and (n+3). To this end, sequencer 9 includes internal logic circuitry, illustrated in FIG. 4, which enables the sequencer to be responsive to clock pulse H only when flip-flop 30 has been set to a one state and a binary one level is derived from one of the 16 bits of bus C 22.

Bus D 11 is coupled through gate 25 to main bus D. Gate 25 is enabled while phase $\phi_n$ is being derived by sequencer 9, a result achieved by connecting output n of sequencer 9 to input terminal 3 of gate 25. Thereby, data read from and written into memory unit 1, in bits 4–31 of bus D 11, and sub-unit numbers, i.e., applicant numbers in bits 0–3, of bus D 11 are coupled through gate 25 to main bus D, at the end of a sequence associated with an applicant sub-unit.

Reference is now made to FIG. 2b of the drawing, wherein there is illustrated a block diagram of a sub-unit, such as one of sub-units 3, 4 or 5 in central sub-system SC8. The exemplary sub-unit illustrated in FIG. 2b, is considered to be sub-unit SE N+1. Sub-unit SE N+1 includes a processing unit (processor) CPU$_{16}$ and a configuration device DC. Processing unit CPU$_{16}$ and configuration device DC are connected to main buses A, D, and C of FIG. 2a by bus A 13, bus D 12, and bus C 26. Buses A 13, D 12 and C 26 have the same bit configuration as the corresponding buses A 10, D 11, and C 22, FIG. 2a, as memory control unit 1 bis. Central processing unit CPU$_{16}$ includes an input output bus I/O responsive to a locally derived multi-bit signal source and connected to a local output device and/or to other sub-units in sub-system SC8. Central processing unit CPU$_{16}$ also includes a 28-bit input DI and a 28-bit output DO for data bits 4–31 coupled to data bus D 12. Central processing unit CPU$_{16}$ includes a 28-bit address output A on which are derived address bits 8–31 for memory unit 1, as well as bits 4–7, which indicate that a sub-unit is not to be signalled; address output A of the central processing unit is coupled to bus A 13. Central processing unit 16 includes control input terminals HIT$_1$ and HIT$_2$, as well as output terminal DR. In response to a binary one signal being applied to control terminal HIT$_1$, central processing unit CPU$_{16}$ is enabled to couple address bits from output A of the processor to bus A 13. In response to a binary one signal being supplied to input terminal HIT$_2$, central processing unit CPU$_{16}$ is activated to supply a multi-bit signal to output terminals D$_0$ and thence to bus D 5. Output terminal DR of central processing unit CPU$_{16}$ is supplied with a binary one signal by the central processing unit when the central processing unit desires to be an applicant sub-unit attempting to access memory unit 1. The signal supplied by central processing unit CPU$_{16}$ to terminal DR is supplied to bus C 26, as one of the 16 bits of that bus.

Configuration device DC comprises a first coder 15 including four switches selectively opened and closed to define a fixed binary combination which identifies each particular sub-unit. The opened and closed states of the switches in coder 15 are coupled to output terminals 0–3 thereof and to input terminals 4–7 of comparator 14, as well as to input terminals 4–7 of comparator 29. Comparator 14 includes input terminals 0–3 responsive to bits 0–3 in bus D 12; bits 0–3 of bus D 12 designate the sub-unit number supplied to main bus D which is connected to the various sub-units and to memory control unit 1 bis. In response to the values of the binary signals applied to terminals 4–7 and terminals 0–3 being equal, comparator 14 derives a binary one output signal that is supplied to output terminal 8 thereof, i.e., comparator 14 derives a binary one output signal in response to the sub-unit identification number set into coder 15 being equal to the sub-unit number indicated by bits 0–3 of bus D 12. The binary one output signal of comparator 14 is coupled in parallel to input terminal HIT$_2$ of central processing unit CPU$_{16}$ and to enable input terminal 8 of gate 17. As indicated supra, the binary one signal supplied to terminal HIT$_2$ of central processing unit CPU$_{16}$ causes the central processing unit to couple a 28 bit data signal to bits 4–31 of data bus D 12. The binary one output signal of comparator 14 coupled to terminal 8 of gate 17 enables the gate to pass the 28 bit output signal of central processing unit CPU$_{16}$ on terminals D$_0$ from terminals 1 of gate 17 to output terminals 3 thereof. The signal at output terminals 3 of gate 17 is coupled to input DI of central processing unit CPU$_{16}$.

A binary one signal is supplied to terminal HIT$_1$ of central processing unit CPU$_{16}$ and as an enable output signal to register 21 (via a connection that is not illustrated) in response to the sub-unit identification number set into coder 15 being equal to the highest priority number in control bus C 26. To this end, the 16 bits in bus C 26 are coupled to priority circuit 27 which is constructed identically to priority circuit 19, FIG. 2a, to derive a four-bit binary indicative of the binary coded value of the highest numbered lead in bus C 26 having a binary one value. The four bits derived from priority circuit 27 are applied to four bit applicant register 28. Applicant register 28 includes output terminals 2–5 respectively coupled to input terminals 0–3 of comparator 29. In response to the four-bit signal coupled to input terminals 0–3 of comparator 29 being equal to the four bits supplied to terminals 7–4 of the comparator, the comparator derives a binary one signal which is supplied to input terminal $HIT_1$ of central processing unit 16. Processor 16 responds to signal $HIT_1$ so address bits are coupled from terminals A to bus A 13, in response to the sub-unit identification number of coder 15 being equal to the highest numbered lead in 16 bit bus C 26 having a binary one value.

Configuration device DC also includes four-bit indicator register 21. Register 21 is responsive to an indicator signal indicative of a number of a sub-unit to be put into service in central sub-system SC8. To this end, service processor 6 derives a four-bit signal which is coupled to four input terminals of indicator register 21. The output signal of service processor 6 is derived in response to activation of a keyboard or other appropriate device in operator console 7. The four-bit signal stored in indicator register 21 is supplied to bits 0–3 of bus A 13 via four-bit bus A 5 in response to a binary one value of signal $HIT_1$.

All of the elements included in the blocks illustrated in FIGS. 2a and 2b can be commercially available electronic components. For example, registers 20 and 21 can be SN 54 5195 chips, while gate 17 can be an SN 54 367 chip and comparators 14 and 29 can be formed of SN 54 85 chips.

Figure 3A:
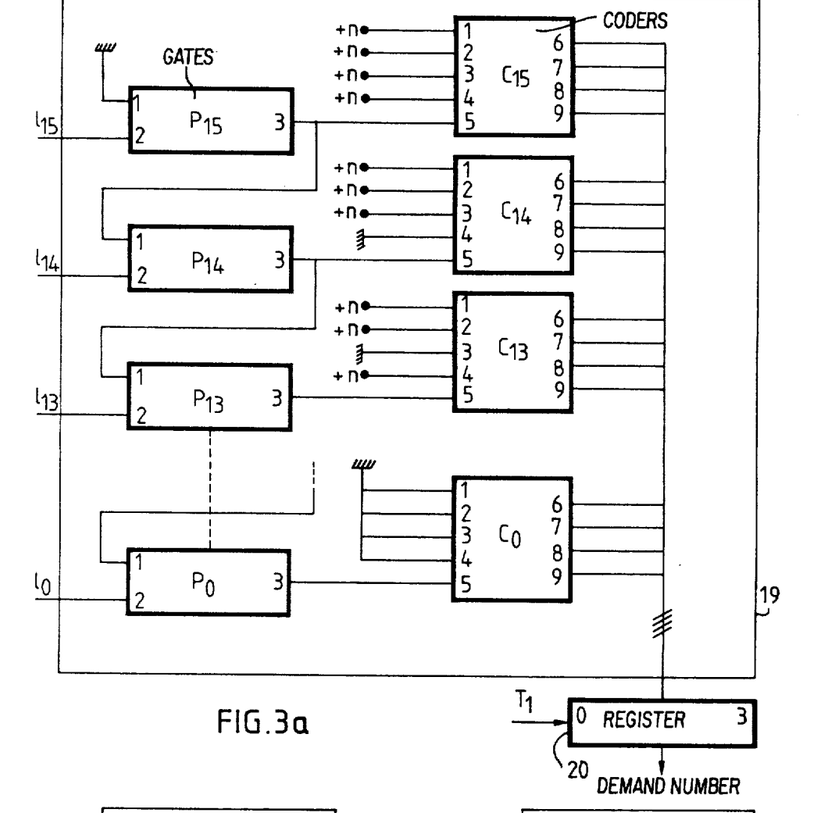
FIG. 3a is a circuit diagram, in block form, of an embodiment of gates used in a priority circuit of the devices illustrated in FIGS. 2a and 2b.

One preferred configuration for priority circuits 19 and 27 is illustrated in FIG. 3a as including 16 gates $P_0-P_{15}$ and 16 coders $C_0-C_{15}$. Each of gates $P_0-P_{15}$ includes input terminals 1 and 2 and output terminal 3. Input terminal 2 of each of gates $P_0-P_{15}$ is responsive to bits 0–15, respectively, of bus C. Terminal 1 of gate $P_{15}$ is connected to reference, ground potential, while terminal 1 of each of the remaining gates $P_{14}-P_0$ is connected to the output terminal 3 of the next higher numbered gate, whereby input terminal 1 of gate $P_i$ is connected to output terminal 3 of gate $P_{i+1}$.

Figures 3B, 3C:
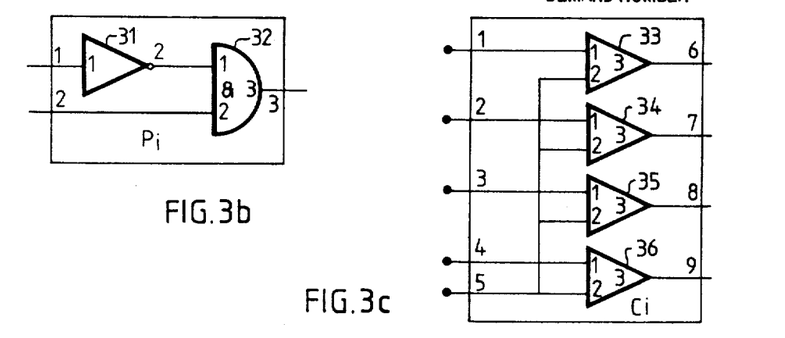

Gates $P_0-P_{15}$ are constructed in such a manner that the gate with the highest number having a binary one applied to input terminal 2 thereof derives a binary one signal on output terminal 3 thereof, to the exclusion of the remaining gates. Thus, if, for example, a binary one signal is applied to input terminal 2 of gate $P_{14}$ and a binary one signal is applied to input terminal 2 of gate $P_{13}$, a binary one signal is derived from output terminal 3 of gate $P_{14}$ and a binary zero is supplied to input terminal 2 of each of the remaining gates $P_0-P_{12}$ and $P_{15}$. To these ends, each of gates $P_0-P_{15}$ includes inverter 31 and AND gate 32, as illustrated in FIG. 3b; output terminals 3 of the various gates are connected to the input terminals 1 thereof, as described supra. As illustrated in FIG. 3b, input terminal 1 of gate $P_i$ is connected to input terminal 2 of inverter 31, having an output terminal 2 which is coupled to input terminal 1 of AND gate 32. Input terminal 2 of gate $P_i$ is connected to input terminal 2 of gate 32, having an output terminal 3, which is coupled directly to output terminal 3 of gate $P_i$. Thus, gate $P_i$ derives a binary one output signal in response to binary zero and one values being respectively applied to input terminals 1 and 2 thereof.

Output terminals 3 of gates $P_0-P_{15}$ are connected to enable input terminals 5 of coders $C_0-C_{15}$, respectively. Thereby, only one of coders $C_0-C_{15}$ is enabled at a time; the enabled coder corresponds with the gate which derives the binary one output. Coders $C_0-C_{15}$ include four input terminals 1–4 and four output terminals 6–9. Input terminals 1–4 of coders $C_0-C_{15}$ are connected to binary one and zero sources (plus n and ground voltages, respectively) so that coder $C_i$ derives a four-bit binary output indicative of the binary value associated with it when it is enabled. For example, input terminals 1–4 of coder $C_0$ are all connected to ground potential, while input terminals 1–4 of coder $C_{15}$ are all connected to potential +n. The input voltages to coders $C_0$ and $C_{15}$ thus respectively represent the binary values 0000 (decimal value 0), and 1111 (decimal value 15). Output terminals 6–9 of coders $C_0-C_{15}$ are connected to input terminals 0–3 of applicant number register 20, FIG. 2a, or applicant register 28, FIG. 2b.

One preferred configuration for coders $C_0-C_{15}$ is illustrated in FIG. 3c. In FIG. 3c, coder $C_i$ is illustrated as including four amplifiers 33–36. Each of amplifiers 33–36 includes two input terminals 1 and 2, and an output terminal 3. Input terminals 1 of amplifiers 33–36 are connected to input terminals 1–4 of coder $C_i$, while input terminal 2 of each amplifier 32–36 is responsive to the output signal of gate $P_i$, as coupled to input terminal 5 of coder $C_i$. Output terminals 3 of amplifiers 33–36 are respectively coupled to output terminals 6–9 of coder $C_i$. Amplifiers 33–36 are constructed so that the amplifiers are effectively disabled in response to a binary zero signal being applied to terminals 2 thereof. To this end, a binary zero applied to terminal 2 of each of amplifiers 32–36 causes the output impedence of the amplifiers to be virtually infinite. In contrast, a binary one signal applied to terminals 2 of amplifiers 33–36 causes the output impedance of the amplifiers to be at a relatively low level, such as 50 ohms. Since only one of coders $C_0-C_{15}$ can be supplied with a binary one signal at a time, the input impedance to stages 0–3 of register 20 remains relatively constant and merely changes in voltage.

Figure 4:
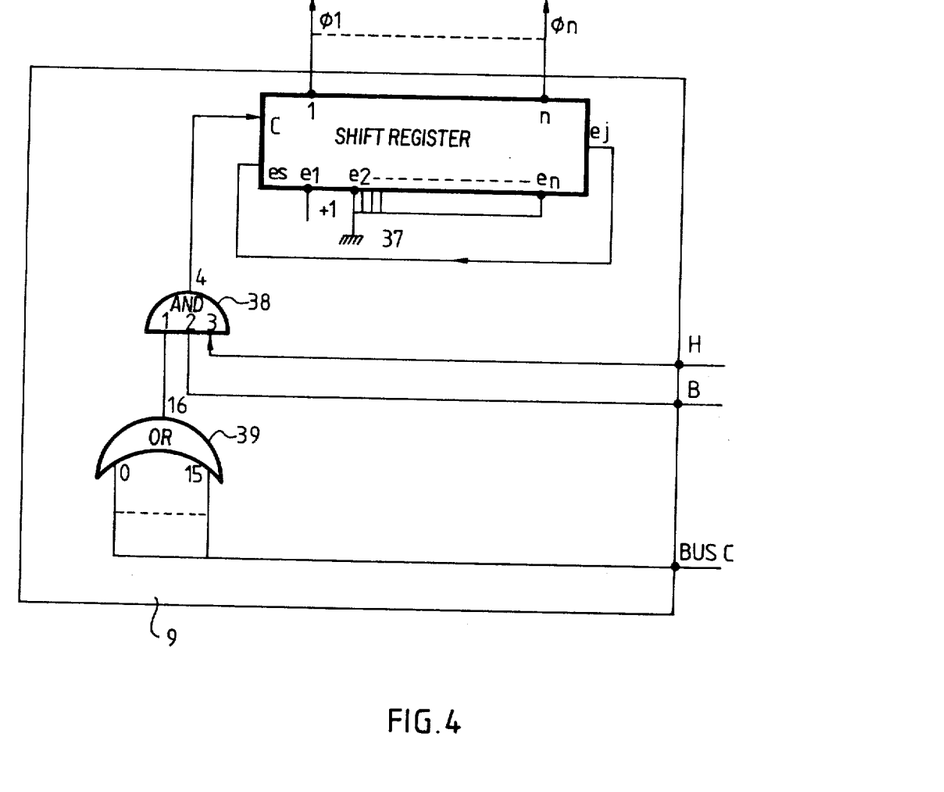

Reference is now made to FIG. 4 of the drawing wherein there is illustrated a circuit diagram of a preferred embodiment of sequencer 9. Sequencer 9 includes a feedback shift register having n stages 1 . . . n on which are respectively derived phases $\emptyset_1 \ldots \emptyset_n$. To achieve the feedback, register 37 includes an output terminal ej directly coupled to input terminal es thereof. A binary one signal is loaded into stage 1 of register 37 by applying a binary one signal to input terminal $e_1$ of the register. Terminal $e_1$ is connected to a set input terminal of a flip-flop stage associated with output terminal 1 of register 37. Remaining flip-flop stages of register 37 are connected via terminals $e_2 \ldots e_n$ to ground. Register 37 also includes a clock input terminal C. In response to each binary one signal applied to terminal C, a binary one value is shifted from one stage to another in register 37 and is recirculated therein.

The binary one signal applied to clock terminal C of register 37 is derived from output terminal 4 of AND gate 38, having input terminals 2 and 3 respectively responsive to clock pulses of signal H and to the signal applied to terminal (n+2), as derived from output terminal Q of flip-flop 30, FIG. 2a. Input terminal 1 of AND gate 38 is responsive to output terminal 16 of OR gate 39, having 16 input terminals 0–15, connected to bus C 22, FIG. 2a. Thereby, in response to any lead in bus C 22 having a binary one value, as occurs in response to any of the 16 possible sub-units in central sub-system SC8 desiring access to memory unit 1, a binary one signal is derived from OR gate 39. The binary one output signal of OR gate 39 and activation of flip-flop 30 to a binary one state by configuration memory 2 enable AND gate 38 so clock pulses of signal H can be supplied to terminal C 2 register 37.

The device of the present invention operates as follows. Initially, the operator decides on the configuration of central sub-system SC8 by deriving signals in operator console 7 indicative of which of sub-units 3, 4, 5, etc., are to be put in service in sub-system SC8. As the sub-units are put into sub-system SC8, the operator decides on the priority thereof, such that the sub-unit having the highest priority is assigned the highest applicant number. The applicant number is entered into the system by way of operator console 7 and service processor 6. The signals from service processor 6 control the settings of the switches in coders 15 of the sub-units put into sub-system SC8 and are stored in indicator register 21. As the different sub-units are put into central sub-system SC8, an indication of which of the sub-units are in the sub-system is stored in configuration memory 2.

In response to a particular sub-unit desiring to gain access to memory unit 1, central processing unit $CPU_{16}$ of the applicant sub-unit supplies a signal to terminal DR of the processing unit. If central processing unit $CPU_{16}$ is in the applicant sub-unit having the highest priority of all of the applicant sub-units at that particular time, a binary one signal is derived from output terminal 8 of comparator 29 of that applicant sub-unit. The central processing unit of the highest priority applicant sub-unit is then coupled with memory unit 1 if the sub-unit has been put into service in sub-system SC8 by a signal from operator console 7.

To determine if the highest priority applicant sub-unit has, in fact, been put into sub-system SC8, bits 0-3 of bus A 13, FIG. 2b, are coupled to bits 0-3 of bus A 10, FIG. 2a. Bits 0-3 of bus A 10 are coupled to configuration memory 2 where they are compared with stored signals indicative of the numbers associated with the sub-units which the operator has put into service in sub-system SC8. In response to the highest priority applicant sub-unit being put into service in sub-system SC8 by the operator, configuration memory 2, FIG. 2a, derives a binary one signal which sets flip-flop 30 into a binary one state, whereby sequencer 9 and gate 23 are enabled. Sequencer 9 is also enabled in response to the binary one signal coupled to terminal DR by the central processing unit of the highest priority applicant sub-unit. The signal at terminal DR is coupled to bus C 26, which is coupled to bus C 22, FIG. 2a. In response to the next pulse of timing signal H, sequencer 9 supplies a binary one signal to output terminal 1 thereof, whereby phase $\emptyset_1$ of sequencer 9 occurs. In response to phase $\emptyset_1$ of sequencer 9 occurring, AND gate 23 is enabled and the four-bit binary number associated with the highest priority applicant sub-unit is coupled to bits 0-3 of bus D 11, FIG. 2a. Thus, during phase $\emptyset_1$ of sequencer 9, a signal indicative of the number of the sub-unit accessing memory unit 1 and having the highest priority is supplied to register 20. During the intermediate phases of sequencer 9, i.e., between phases $\emptyset_1$ and $\emptyset_n$, main buses A, D, C are free to perform other tasks which may not be associated with sub-system SC8 and the sub-units can perform internal tasks because they are isolated from the main buses.

When sequencer 9 reaches phase $\emptyset_n$, gate 25 is enabled, whereby data bits 4-31 of bus D 12, FIG. 2b, are coupled through gate 25 to data bits 4-31 of bus D 11, FIG. 2a. Thereby, data are read from or written into memory unit 1 at an address determined by bits 8-31 of bus A 10, FIG. 2a. At this time, bits 8-31 of bus A 10, FIG. 2a, are coupled to address bits 8-31 of bus A 13 in the highest priority applicant sub-unit. Simultaneously, bits 0-3 of bus D 11 are coupled through gate 25 to bus D 12 (FIG. 2b) of each sub-unit and thence to terminals 0-3 of comparator 14. Comparator 14 of the sub-unit having the same number as derived from coder 15 supplies a binary one signal to terminal $HIT_2$ of the central processing unit $CPU_{16}$ of that sub-unit. The central processing unit $CPU_{16}$ and gate 17 are activated by the binary one value of $HIT_2$ to couple input DI and output DO thereof with bits 4-31 of bus D 12.

Now assume that during an interval while sub-unit 3 was accessing memory unit 1, sub-units 4 and 5 attempted to access to memory unit 1. Under such circumstances, after sub-unit 3 completed data exchange with memory unit 1, sub-unit 5 gains access to memory unit 1 prior to sub-unit 4 gaining access to the memory unit. This is because priority circuits 19 and 27 are included in memory control unit 1 bis and in each of the sub-units.

The central processing unit $CPU_{16}$ of the sub-units attempting to gain access to memory unit 1 derive binary one signals on output terminals DR thereof until an accessing sequence commanded thereby has been completed. Upon completion of the accessing sequence, the trailing edge of the phase $\emptyset_n$ output of sequencer 9 is fed to all the central processing unit $CPU_{16}$ via a connection (not shown). Each of central processing units $CPU_{16}$ includes internal circuitry, e.g., a flip-flop, which is set in response to signal $HIT_1$ having a binary one value and is reset in response to the trailing edge of phase $\emptyset_n$. Resetting of this flip-flop causes the signal at terminal DR to return to zero. Only the applicant having the highest priority is recognized and data are transferred between the highest priority applicant sub-unit and memory unit 1 via gate 25 of memory control unit 1 bis.

If the highest priority applicant sub-unit is not put into service in sub-system SC8 in response to a signal from operator console 7, configuration memory 2 derives a binary zero output signal when such a sub-unit attempts to gain access to memory unit 1. The binary zero output signal of configuration memory 2 has no effect of flip-flop 30, whereby gate 23 and sequencer 9 are disabled. Thereby, the sub-unit attempting to gain access to memory unit 1 is unable to gain access to the memory unit. Central processing unit $CPU_{16}$ in such a sub-unit then supplies a binary zero signal to terminal DR of the central processing unit and the system gives priority to the applicant sub-unit having the next highest priority.

It should thus be obvious that the apparatus that has been described enables simultaneous operation of several processors P which are connected together, even though the processors are in separate sub-units and are included in a single central sub-system connected to a single memory unit. The device enables the processors of the different sub-units to be completely independent with a relatively simple electronic configuration circuit, such that each of the sub-units is associated with an identical configuration device DC and all of the circuits are connected to a common control unit 1 bis.

While there has been described and illustrated one specific embodiment of the invention, it will be clear that variations in the details of the embodiment specifically illustrated and described may be made without departing from the true spirit and scope of the invention as defined in the appended claims.

We claim:

1. Apparatus for enabling plural processors to exchange data signals with a single addressable memory unit via a single address bus and a single data bus and for enabling the processors to be isolated from each other, the processors being assigned priorities for accessing the memory, whereby one of the processors is a processor having a higher priority than any other processor and is termed as the highest priority processor, each of the processors deriving a first signal when it desires to access the memory unit, the processors being selectively put into service by an operator command, the apparatus comprising means for storing indications of the processors put into service by the operator command, means for deriving a presence signal in response to the highest priority processor deriving the first signal being indicated in the means for storing as a processor put into service, means responsive to the presence signal and to the first signals of the processors for deriving a second signal indicative of the highest priority processor deriving the first signal, means responsive to the presence signal for coupling the second signal to all of the processors and for coupling data terminals of the memory unit with the data bus, separate means for each processor responsive to the second signal for coupling the data bus to data terminals of only the processor having a number associated with the value of the second signal and for enabling address signals from only the processor having a number associated with the value of the second signal to be coupled via the address bus to address terminals of the memory unit.

2. The apparatus of claim 1 wherein the means for deriving the presence signal includes means associated with each processor responsive to the first signals for deriving a third signal indicative of the processor having the highest priority, the third signal being compared with the indications in the means for storing to enable the presence signal to be derived.

3. Apparatus wherein a central data processing subsystem is divided into several sub-units, the central sub-system including a service processor common to the sub-units and controlled from an operator console common to the sub-units, the sub-units being connected together by data, address and control buses, each sub-unit having the ability to function separately from the other sub-units and including at least one processor having an input-output channel, the sub-system being connected by the address and data buses to a memory unit for storing programs and data associated with the sub-units of the sub-system;

each sub-unit comprising: a configuration device having means for storing an appurtenance indicator derived from the service processor in response to initialization of the sub-unit, the appurtenance indicator of each of said sub-units being associated with a different number and a different priority to which a particular sub-unit is assigned, whereby one of the sub-units is a sub-unit designated as a highest priority sub-unit, the configuration device enabling the sub-unit associated therewith to exchange data with a single memory unit common to the sub-units only when a comparison of the numbers of the sub-units with data to be exchanged with the single memory unit indicates that the particular sub-unit has the highest priority of the sub-units with data to be exchanged with the memory unit;

a network common to the sub-units comprising: a single configuration memory for storing indications of the sub-units in service in the central sub-system, the configuration memory being addressed each time the memory unit is addressed by a sub-unit, the configuration memory being addressed by the appurtenance indicator stored in the configuration device of the enabled sub-unit, the configuration memory activating the enabled sub-unit to perform memory cycles only when the configuration memory contains an indication that the enabled sub-unit is in service in the sub-system;

a memory means common to the sub-units comprising: a priority circuit responsive to the numbers of the sub-units with data to be exchanged with the storing unit for selecting and deriving an indication of the highest priority sub-unit with data to be exchanged with the storing unit, memorization means responsive to the priority circuit for storing the indication derived by the priority circuit of the highest priority sub-unit with data to be exchanged with the memory unit, the memorization means deriving an output that is coupled to the data bus assigned to transmit a signal indicative of the number assigned to the sub-unit with data to be exchanged with the memory unit to each of the configuration devices, thereby to establish data transmission between the sub-unit having the highest priority and the memory unit.

4. Apparatus wherein a central sub-system of a data processing system is divided into 1 ... K ... N sub-units capable of functioning independently of each other and sharing a common addressable memory unit, where N is a positive integer greater than one and K is any number from 1 to N, the central sub-system including an operator console for selectively controlling activation of the sub-units to an in service state, each sub-unit being assigned a priority number and including a processor having data, control and address terminals respectively connected to data, control and address buses common to the sub-units, whereby one of the sub-units has a priority higher than any other of the sub-units and is termed the highest priority sub-unit, the processor of each sub-unit supplying a first signal to a control terminal thereof and to the control bus when the sub-unit desires access to the common memory unit, said apparatus comprising means responsive to the first signal derived from the processor of each sub-unit as coupled to the apparatus via the control bus and the operator console for (a) storing indications of which of the sub-units are in service and (b) deriving a second signal in response to the first signal from the highest priority sub-unit being indicated in the storing means as one of the sub-units in service, the second signal being derived after the indications of which of the sub-units are in service have been stored, a common controller for the sub-units and the memory unit responsive to one of the first signals derived at a particular time from one of the sub-units and the second signal for deriving a third signal indicative of the highest priority sub-unit deriving the first signal at the particular time, said controller including circuit means responsive to derivation of the second signal for coupling the third signal to the N sub-units via one of said buses and for coupling the data bus to data terminals of the memory unit, sub-unit K including means responsive to the third signal being indicative of sub-unit K for controlling the processor of sub-unit K so: (a) data are coupled between (1) data terminals of the processor of sub-unit K via the data bus and the circuit means, and (2) the data terminals of the memory unit, and (b) address terminals of the processor of sub-unit K are coupled to address terminals of the memory unit via the address bus so that data are coupled between (1) the data terminals of the processor of the highest priority sub-unit deriving the first signal and (2) an address of the memory unit derived from the address terminals of the processor of the highest priority sub-unit deriving the first signal.

5. The apparatus of claim 4 wherein the circuit means includes: a flip-flop responsive to the second signal so that the flip-flop is driven to a set state in response to derivation of the second signal, a sequencer responsive to the flip-flop being in the set state and the first signal being derived by any of the sub-units for deriving first and second time spaced enabling signals, a register responsive to the flip-flop being in the set state and derivation of the first enabling signal for storing an indication of the magnitude of the third signal, gate means responsive to the second enabling signal for coupling the third signal from the register to the N sub-units and for coupling the memory unit data terminals to the data bus, and means responsive to the second enabling signal for driving the flip-flop to a reset state.

6. The apparatus of claim 4 wherein a portion of the means for storing and for deriving the second signal is included in each of the sub-units, the portion of the means for storing in sub-unit K including: means responsive to the first signals derived by each of the sub-units for deriving a fourth signal indicative of the highest priority sub-unit deriving the first signal, means for deriving a fifth signal in response to the fourth signal being commensurate with sub-unit K, said fifth signal being coupled as a control input signal for the processor of sub-unit K to cause the processor of sub-unit K to supply an address signal to the memory unit via the address bus and to feed a signal indicative of a number associated with sub-unit K to the means for storing via the address bus.

7. The apparatus of claim 6 wherein sub-unit K includes: a storage register responsive to the operator console for storing the signal indicative of a number assigned to the sub-unit, said storage register deriving first output bits commensurate with said number and coupled to the address bus, the processing unit being responsive to derivation of the fifth signal by sub-unit K for deriving second output bits commensurate with addresses in the memory unit, the first output bits being coupled to the means for storing via the address bus in response to derivation of the fifth signal by sub-unit K, and the second output bits being coupled to the address bus in response to derivation of the fifth signal by sub-unit K.

8. The apparatus of claim 6 wherein the means for deriving the fifth signal in sub-unit K includes: a coder for deriving third output bits commensurate with the number of sub-unit K, means responsive to the first signal of the N sub-units for deriving fourth output bits commensurate with the number of the highest priority sub-unit deriving the first signal, and means responsive to the third and fourth output bits being associated with the same numbers for deriving the fifth signal.

9. The apparatus of claim 4, 5, 6 or 7 wherein sub-unit K includes: a coder for deriving third output bits commensurate with the number of sub-unit K, the third signal including a first set of bits commensurate with the number of the highest priority sub-unit deriving the first signal, and means responsive to the third output bits and the first set of bits being associated with the same numbers for coupling data bits between the processor of sub-unit K and data terminals of the memory unit via the data bus.

10. The apparatus of claim 6 wherein sub-unit K includes: a storage register responsive to the operator console for storing a signal indicative of a number assigned to the sub-unit, said storage register deriving first output bits commensurate with said number and coupled to the address bus, the processing unit being responsive to derivation of the fifth signal by sub-unit K for deriving second output bits commensurate with addresses in the memory unit, the first output bits being coupled to the means for storing via the address bus in response to derivation of the fifth signal by sub-unit K, the second output bits being coupled to the address bus in response to derivation of the fifth signal by sub-unit K, the means for deriving the fifth signal including a coder for deriving third output bits commensurate with the number of sub-unit K, means responsive to the first signal of the N sub-units for deriving fourth output bits commensurate with the number of the highest priority sub-unit deriving the first signal, and means responsive to the third and fourth output bits being associated with the same numbers for deriving the fifth signal.

11. The apparatus of claim 6 wherein sub-unit K includes: a storage register responsive to the operator console for storing a signal indicative of a number assigned to the sub-unit, said storage register deriving first output bits commensurate with said number and coupled to the address bus, the processing unit being responsive to derivation of the fifth signal by sub-unit K for deriving second output bits commensurate with addresses in the memory unit, the first output bits being coupled to the means for storing via the address bus in response to derivation of the fifth signal by sub-unit K, the second output bits being coupled to the address bus in response to derivation of the fifth signal by sub-unit K, a coder for deriving third output bits commensurate with the number of sub-unit K, the third signal including a first set of bits commensurate with the number of the highest priority sub-unit deriving the first signal, and means responsive to the third output bits and the first set of bits being associated with the same numbers for coupling data bits between the processor of sub-unit K and data terminals of the memory unit via the data bus.

12. The apparatus of claim 6 wherein sub-unit K includes: a storage register responsive to the operator console for storing a signal indicative of a number assigned to sub-unit K, said storage register deriving first output bits commensurate with said number and coupled to the address bus, the processing unit and storage register being responsive to derivation of the fifth signal by sub-unit K for respectively deriving second output bits commensurate with addresses in the memory unit and a further signal indicative of the number assigned to sub-unit K, the second output bits and further signal being coupled to the address bus in response to derivation of the fifth signal by sub-unit K, a coder for deriving third output bits commensurate with the number of sub-unit K, means responsive to the first signal of the N sub-units for deriving fourth output bits commensurate with the number of the highest priority sub-unit deriving the first signal, and means responsive to the third and fourth output bits being associated with the same numbers for deriving the fifth signal, the third signal including a first set of bits commensurate with the number of the highest priority sub-unit deriving the first signal, and means responsive to the third output bits and the first set of bits being associated with the same numbers for coupling data bits between the processor of sub-unit K and data terminals of the memory unit via the data bus.

13. The apparatus of claim 6 wherein sub-unit K includes: a coder for deriving third output bits commensurate with the number of sub-unit K, means responsive to the first signal of the N sub-units for deriving fourth output bits commensurate with the number of the highest priority sub-unit deriving the first signal, and means responsive to the third and fourth output bits being associated with the same numbers for deriving the fifth signal, the third signal including a first set of bits commensurate with the number of the highest priority sub-unit deriving the first signal, and means responsive to the third output bits and the first set of bits being associated with the same numbers for coupling data bits between the processor of sub-unit K and data terminals of the memory unit via the data bus.

14. The apparatus of claim 6, 7, 8, 10, 11, 12 or 13 wherein the circuit means includes: a flip-flop responsive to the second signal so that the flip-flop is driven to a set state in response to derivation of the second signal, a sequencer responsive to the flip-flop being in the set state and the first signal being derived by any of the sub-units for deriving first and second time spaced enabling signals, a register responsive to the flip-flop being in the set state and derivation of the first enabling signal for storing an indication of the magnitude of the third signal, gate means responsive to the second enabling signal for coupling the third signal from the register to the N sub-units and for coupling the memory unit data terminals to the data bus, and means responsive to the second enabling signal for driving the flip-flop to a reset state.

15. The apparatus of claim 4 or 5 wherein sub-unit K includes: a coder for deriving third output bits commensurate with the number of sub-unit K, the third signal including a first set of bits commensurate with the number of the highest priority sub-unit deriving the first signal, and means responsive to the third output bits and the first set of bits being associated with the same numbers for coupling data bits between the processor of sub-unit K and data terminals of the memory unit via the data bus.

* * * * *